Figure 1:
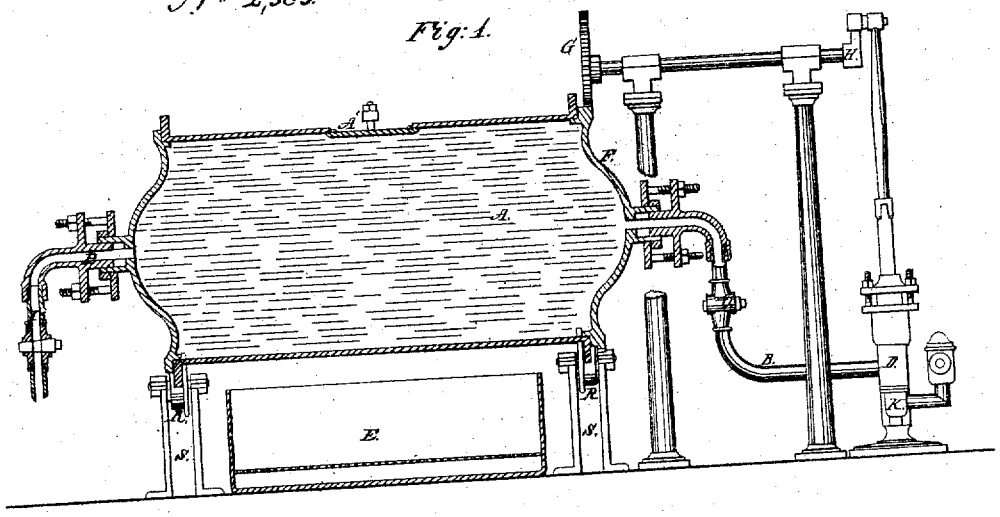
Figure 2:
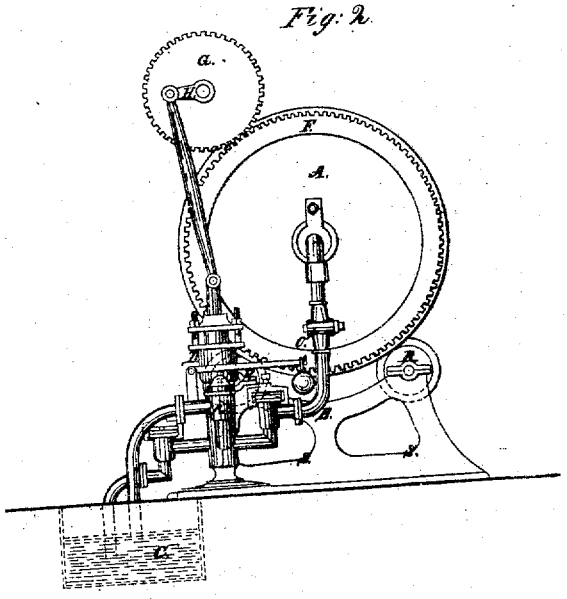

H. L. Jones & D. S. Farquharson.
Pulp Digester.

No. 2,383. Reissued Oct. 23, 1866.

Witnesses.
Albert M. Hastings
Alfonda M. Fear.

Inventor.
Duncan S. Farquharson
Henry L. Jones

UNITED STATES PATENT OFFICE.

THE HYDROSTATIC PAPER COMPANY, OF ROCHESTER, N. Y., ASSIGNEES, BY MESNE ASSIGNMENTS, OF HENRY L. JONES AND DUNCAN S. FARQUHARSON.

IMPROVEMENT IN TREATING WOOD, STRAW, &c., FOR THE MANUFACTURE OF PAPER-PULP.

Specification forming part of Letters Patent No. 55,418, dated June 5, 1866; Reissue No. 2,383, dated October 23, 1866.

*To all whom it may concern:*

Be it known that HENRY L. JONES and DUNCAN S. FARQUHARSON, of Rochester, Monroe county, State of New York, have invented a new and Improved Mode of Treating Straw, Wood, or any other fibrous material used in or for the manufacture of paper-pulp by subjecting the same to the action of alkaline liquor under hydrostatic pressure of the liquor itself, without steam-pressure, as a preparation for the bleaching thereof in the forms usually adopted, with convenient machinery or apparatus for the application of such principle, which is an improvement upon that for which Letters Patent were issued to said Jones and Farquharson March 13, 1866, No. 53,152; and we do hereby declare that the following is a full and exact description thereof, reference being had to the accompanying drawings, and to the letters of reference marked thereon.

The nature of the invention and improvement thereon consists in subjecting the straw, wood, or other fiber to the action of alkali liquor of suitable strength under the hydrostatic pressure of the liquor itself, without steam-pressure, in a tight vessel capable of resisting pressure. The material to be acted upon, after being cut up into short lengths or into small pieces for convenience of working, is placed in a hollow cylinder or other convenient vessel, into which the alkali liquor of suitable temperature is forced by a force-pump, or by any other mechanical appliances by which the hydrostatic pressure of the liquor upon the material can be obtained; or the material may be placed in the cylinder or other vessel, which may then be filled, or nearly filled, with the alkali liquor. The necessary pressure may then be obtained by forcing into the cylinder or vessel any liquid, or even air itself, or it may be secured by any mechanical appliance by which the pressure of the alkali liquor upon the material to be acted upon can be obtained while the chemical action is taking place.

In order that others skilled in the art to which the invention appertains may be enabled to understand and use the same, we will proceed to describe it in detail in connection with one form of apparatus whereby it may be carried into effect.

In the drawings hereto annexed, A represents a hollow cylinder, into which the material to be acted upon is placed. B represents a pipe, through which the cylinder A communicates with the vat C, containing the alkali liquor, which is forced from the vat C, through the pipe B, into the cylinder A by means of a pump, D, which may be operated by power.

In this way the alkali liquor is forced into the cylinder A, containing the material to be acted upon, under pressure sufficient to thoroughly impregnate and disintegrate the material. The chemical action which takes place is, by this process, accelerated and rendered much more efficient and thorough than it is under the method ordinarily used. The amount of pressure required will depend upon the material to be acted upon. The liquor may be used cold, or may be heated to any desirable temperature and forced in while hot in order to facilitate the process; and the vessel containing the material to be acted upon may be rotated or agitated by any mechanical appliance in order also to quicken the operation.

The material is introduced into the cylinder A through a man-hole at A′, through which the contents of the cylinder are discharged after the process is completed into a receiving-tank, E, provided with a false bottom for draining. The material may then be cleaned from the coloring-matter and of other waste material by washing with water in a vat or tank, or in the ordinary paper-engine, and it is then ready for bleaching.

An apparatus consisting of the above-described parts, or their equivalents, is all that is necessary to carry out the invention; but we will now proceed to describe devices which perform certain functions which render the operation of the apparatus more perfect.

The cylinder A is mounted upon friction-rollers R R, supported by the frames S S, made of sufficient strength to support the weight of the cylinder and at the same time act as bearings for a rotary motion to be communicated to the cylinder A.

F is a spur-gear bolted on one end of the cylinder A. G is a pinion attached to a small counter-shaft, on which may be keyed a driving-pulley, by which a slow rotary motion may be communicated to the cylinder A. H is a short crank or arm keyed to the opposite end of the above-described counter-shaft, to which is attached the connecting-rod of the force-pump D, which forces the liquor, through the pipe B, from the vat C into the cylinder A.

The safety-valve K, held down by an adjustable weight, is placed below the discharging-valve of the pump D, and communicates with the pump-barrel below the plunger or piston, so that when the pressure becomes excessive the valve is raised, and when raised a secondary valve is raised, which allows the liquid to flow back to the vat C. The stop-cock O is closed when sufficient pressure is obtained, and the pressure is thus allowed to continue until the process is completed.

The stop-cock P, at the opposite end of the cylinder A, is intended to relieve the pressure when the process is completed and allow the excess of liquid to flow back through the pipe I into the vat C.

The above-described apparatus furnishes a convenient method for applying the invention; but we state explicitly that we do not intend to confine ourselves to any particular apparatus, but propose to avail ourselves of such modifications as may be found desirable.

Having thus described the invention of the said JONES and FARQUHARSON, the following is what we claim as new and desire to protect by the issue of Letters Patent:

1. The subduing of straw, wood, or any fibrous material to be converted into pulp by subjecting the same to the action of alkali liquor of any desirable temperature, applied under the hydrostatic pressure of the liquid itself, applied by a force-pump or otherwise instead of using steam-pressure, preparatory to the bleaching of such material in the ordinary method, substantially as described.

2. The combination, with the cylinder A, of the pump D and pipe B, substantially as and for the purposes above set forth.

3. The safety-valve K, in combination with the pump D, below the piston or plunger, and in direct communication with the pump-barrel, substantially as above described.

[L. S.] THE HYDROSTATIC PAPER CO.,
By L. C. WOODRUFF,
*Its President.*

In presence of—
DE L. CRITTENDEN,
EDWARD S. YOUNG.